UNITED STATES PATENT OFFICE.

JAMES P. PERKINS, OF PULLMAN, ILLINOIS.

PAINT.

SPECIFICATION forming part of Letters Patent No. 318,791, dated May 26, 1885.

Application filed January 31, 1885. (Specimens.)

*To all whom it may concern:*

Be it known that I, JAMES P. PERKINS, of Pullman, in the county of Cook and State of Illinois, have invented certain new and useful Improvements in Paint; and I do hereby declare that the following is a full, clear, and exact description thereof.

The object of this invention is to provide an iron paint of superior quality, which may be readily and cheaply manufactured; and it consists in a paint composed of silicate slag as a base and oil as a vehicle, the components being ground together, as hereinafter stated.

I have discovered that silicate slag from iron-furnaces, consisting, principally, of iron chemically combined with silicon, is capable of extremely fine comminution by mechanical means, and that the comminuted silicate slag unites admirably with oil or other vehicles to form a product having in a high degree all the valuable properties of iron paint, and having better flowing and enduring qualities than any other iron-paint compound hitherto produced.

Silicate slag suitable for making a paint-base, as above described, may be found in the iron slag from blast, puddling, or reheating furnaces, and obtained by selecting the parts of the slag in which oxide of iron and silicon or silicate of iron are present in a practically pure state, or with a comparatively slight admixture of foreign substances. The parts of the slag which contain the iron and silicon in the greatest purity are usually found adjacent to the outer surfaces of the cooled blocks or cakes taken from the molds or pits into which the slag is run from the furnace. The parts of the slag mentioned may be readily distinguished as being the heaviest and more dense or compact part of the mass, and as being black, or nearly so, in color, and also as having a vitreous fracture. Parts of the slag or cinder in which iron oxide and silicon are practically absent are, on the other hand, characterized by their porosity, light color, and relatively low specific gravity. It is therefore readily practicable to make the desired selection from a mass of slag of that portion which is available for the purpose of this invention. In the case of slag from a blast-furnace the silicate of iron is present in comparatively small quantities; but as it accumulates in the position, and is distinguishable by the characteristics above indicated, it may be readily selected by observing the foregoing suggestions. In the slag or solidified liquid cinder which forms the refuse from puddling or reheating furnaces the relative quantity of oxide of iron and silicon is larger, the presence of a considerable part of the silicon being due to the melting of the sand forming the furnace-hearth. In this case the selection of proper material will be attended with little difficulty, and this source of supply may, therefore, be more commonly relied on with advantage. It is a well-known fact that this slag or cinder, especially that from reheating and puddling furnaces, contains a larger proportion of iron; but the latter, being chemically united with silicon in the form of silicate of iron, is practically incapable of separation for any useful purpose as a metal, and has, therefore, been considered as of no value whatever. By selecting the parts of the slag mentioned I am able to obtain at a very slight expense the silicate slag in a sufficiently pure state for use in manufacturing the paint compound above set forth, while turning to valuable account a material that has heretofore been practically a mere waste.

In carrying my invention into practice the solidified silicate slag is reduced by crushing or grinding to any desired fineness in a dry state, after which it is mixed with oil in due quantities, then further ground in a mill suitable for the purpose. For the better qualities of paint I prefer to carry forward the dry reduction of the material until it is reduced to a granular condition corresponding to fine gunpowder, and to then mix the oil therewith and grind the two ingredients together until the granular character of the base disappears, or until fine enough for the particular purpose to which the paint is to be applied. The dry reduction may, however, be continued further than above indicated, or until the material is finely powdered, after which it may be mixed with oil and ground, both for its further reduction and to thoroughly incorporate the ingredients.

The paint produced from the material named above develops, when properly ground, a deep reddish-brown color, very popular and desirable for many purposes; but suitable pigments may be added to impart to the paint any color which may be desired. It has been found that a base consisting of silicate slag, though itself very dark, is extremely susceptible to the action of the usual substances employed in coloring paints, and that a large variety of colors may be produced with the use of a less proportionate quantity of pigment than is commonly needed for other bases.

It is of course understood that other liquids may be employed in connection with the oil for drying and other purposes, as in other oil-paints.

I am aware that paint compounds have heretofore been made containing oxide of iron and silica; but such compounds have been made only from ores in which the substances mentioned are present in mechanical admixture, it being a well-known fact that iron occurs in ores usually in the form of ferric or ferrous oxides, and not in combination with silicon as a natural silicate. Silicate slag containing oxide of iron and silicon chemically combined, as present in silicate slags, is found to possess as a paint-base superior and valuable qualities in giving body and durability to the paint not possessed by iron oxides and silica when used in their natural or mechanically combined state, as found in ores.

I claim as my invention—

A paint composed of silicate slag ground in oil, as set forth.

In testimony that I claim the foregoing as my invention I affix my signature in presence of two witnesses.

JAMES P. PERKINS.

Witnesses:
M. E. DAYTON,
OLIVER E. PAGIN.